United States Patent
Li et al.

(10) Patent No.: US 12,320,412 B2
(45) Date of Patent: Jun. 3, 2025

(54) AXIAL PISTON VARIABLE DISPLACEMENT HYDRAULIC DEVICES, SUCH AS HYDRAULIC MOTORS, AND METHODS OF OPERATING SAME

(71) Applicant: Regents of the University of Minnesota, Minneapolis, MN (US)

(72) Inventors: Perry Y. Li, Plymouth, MN (US); Evan D. Sand, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 3 days.

(21) Appl. No.: 18/243,213

(22) Filed: Sep. 7, 2023

(65) Prior Publication Data

US 2024/0077135 A1  Mar. 7, 2024

Related U.S. Application Data

(60) Provisional application No. 63/404,236, filed on Sep. 7, 2022.

(51) Int. Cl.
*F16H 39/14*  (2006.01)
*F01B 3/00*  (2006.01)
*F04B 7/00*  (2006.01)

(52) U.S. Cl.
CPC ........... *F16H 39/14* (2013.01); *F01B 3/0055* (2013.01); *F01B 3/007* (2013.01); *F04B 7/0069* (2013.01)

(58) Field of Classification Search
CPC ...... F16H 39/14; F16H 61/42; F16H 61/4035; F01B 3/0055; F01B 3/007; F04B 7/0057; F04B 7/0069

(Continued)

(56) References Cited

U.S. PATENT DOCUMENTS 4,875,390 A * 10/1989 Hayashi .................. F16H 61/42
                                                60/487
5,054,289 A * 10/1991 Nagatomo .............. F16H 39/14
                                                60/489

(Continued)

FOREIGN PATENT DOCUMENTS

FR         2883918 B1      7/2007

OTHER PUBLICATIONS

Rampen, W. H. S., "The Digital displacement hydraulic piston pump". PhD thesis, Univ. of Edinburgh, Dec. 1992. 225 pages.

(Continued)

*Primary Examiner* — Kenneth J Hansen
(74) *Attorney, Agent, or Firm* — Dicke, Billig & Czaja, PLLC

(57) ABSTRACT

Devices and methods for improving the efficiency of an axial piston hydraulic motor or other axial piston hydraulic device. In some embodiments, a valve cam, with specified geometry, is assembled to a conventional axial piston hydraulic device (e.g., hydraulic motor, hydraulic pump, hydraulic pump-motor) in a manner permitting selective rotation of the valve cam relative to the distributor valves (e.g., spool valves). The rotating valve cam facilitates variable piston stroke and can be provided in conjunction with (e.g., joint control) an adjustable swashplate according to a mathematical relationship in order to adjust the displacement of the axial piston hydraulic motor (or other device) while maintaining optimal pre-compression and decompression across a range of operating conditions. This configuration allows, for each desired effective displacement of the hydraulic motor, a set of optimal valve timing to achieve perfect pre-compression and decompression so as to eliminate associated throttling losses.

17 Claims, 20 Drawing Sheets

(58) Field of Classification Search
USPC .................................. 251/251; 60/487, 489
See application file for complete search history.

(56) References Cited

U.S. PATENT DOCUMENTS

| | | | |
|---|---|---|---|
| 7,171,932 | B2 | 2/2007 | Vattaneo et al. |
| 7,340,988 | B2 | 3/2008 | Vicentini |
| 8,074,558 | B2 | 12/2011 | Knussman et al. |
| 9,284,942 | B2 | 3/2016 | Allart et al. |
| 10,247,178 | B2 | 4/2019 | Sink et al. |
| 10,550,739 | B2 | 2/2020 | Raimondi |
| 10,598,055 | B2 | 3/2020 | Kataoka et al. |
| 10,738,757 | B2 | 8/2020 | Rannow et al. |

OTHER PUBLICATIONS

Montzka et al., "Experimental Testing of a Variable Displacement Pump/Motor that uses a Hydro-mechanically Timed Digital Valving Mechanism to Achieve Partial Stroke Piston Pressurization (PSPP)", FPMC2019-1693, ASME/Bath Proceedings of Symposium on Fluid Power and Motion Control, Oct. 2019. 10 pages.

Rannow et al., "Discrete Piston Pump/Motor Using a Mechanical Rotary Valve Control Mechanism", Proceedings of the 8th Workshop on Digital Fluid Power (DFP16), Tampere, Finland, May 2016. 12 pages.

Tian et al., "Valve Timing Control for a Digital Displacement Hydraulic Motor using an Angle-Domain Repetitive Controller", ASME/IEEE Trans. on Mechatronics, vol. 24(3), Mar. 2019. pp. 1306-1315.

Marschand et al., "Comparison of a Variable Displacement 3-Piston Inline Digital Pump Using Electrically and Mechanically Actuated Poppet Valves", 11th International Fluid Power Conference, Aachen, Germany, Mar. 2018. 6 pages.

Kuzmin et al., "Advanced Axial Piston Swash Plate Pump Parameters Recommendations", Proceedings of the 27th DAAAM International Symposium, B. Katalinic (Ed.), Published by DAAAM International, Vienna, Austria, 2016. pp. 0556-0561.

Wang et al., "A Novel Pressure-Controlled Hydro-Mechanical Transmission", FPMC2014-7862, ASME/Bath Proceedings of Symposium on Fluid Power and Motion Control, Sep. 2014. 7 pages.

Hu et al., "Piston-by-Piston Detailed Modeling of A Novel Hydro-Mechanical Transmission", 2019 6th IEEE International Conference on Engineering Technologies and Applied Sciences (ICETAS), Dec. 2019. 6 pages.

\* cited by examiner

| Symbol | Description | Value |
|---|---|---|
| $\rho$ | Oil density at 40° C | $867\ kg/m^3$ |
| $\beta$ | Oil bulk modulus | $1.4\ GPa$ |
| $\alpha$ | Vol. fraction of entrained air at $P_0$ | 0.01 |
| $P_0$ | Atmospheric pressure | $100\ kPa$ |
| $D_p$ | Displacement of pump | $5.99\ cc/rev$ |
| $\rho$ | Oil density at 40° C | $867\ kg/m^3$ |
| $V_0$ | Minimum dead volume of motor cyl. | $1.60\ cc$ |
| $R$ | Radius of stock motor cam | $42.6\ mm$ |
| $e$ | Eccentricity of stock motor cam | $4.0\ mm$ |
| $d_v$ | Diameter of spool valves | $6.0\ mm$ |
| $k_H, k_L$ | Fraction of valve circumference open to flow | 0.5, 0.5 |
| $C_d$ | Valve discharge coefficient | 0.67 |
| $A_l$ | Leakage orifice area in each cylinder of pump and motor | $6 \cdot 10^{-9}\ m^2$ |
| $L_l$ | Coefficient of laminar leakage in each cylinder of pump and motor | $5 \cdot 10^{-15}\ m^3/s \cdot Pa$ |
| $P_{cv,cr}$ | Check valve cracking pressure | $10\ kPa$ |
| $P_{cv,max}$ | Check valve maximum opening pressure | $20\ kPa$ |
| $A_{cv}$ | Check valve maximum orifice area | $1 \cdot 10^{-5}\ m^2$ |

FIG. 12

AXIAL PISTON VARIABLE DISPLACEMENT HYDRAULIC DEVICES, SUCH AS HYDRAULIC MOTORS, AND METHODS OF OPERATING SAME

CROSS REFERENCE TO RELATED APPLICATIONS

This Non-Provisional patent application claims the benefit of the filing date of U.S. Provisional Patent Application No. 63/404,236, filed Sep. 7, 2022, entitled "AXIAL PISTON VARIABLE DISPLACEMENT HYDRAULIC DEVICES, SUCH AS HYDRAULIC MOTORS, AND METHODS OF OPERATING SAME" the entire teachings of which are incorporated herein by reference.

BACKGROUND

The present disclosure relates to axial piston devices, such as motors and pumps. More particularly, it relates to axial piston variable displacement motor and pumps improved efficiency and methods of operating the same.

Variable displacement pumps, motors and pump-motors (a fluidic machine that can operate as a pump or as a motor) generally include a number of pistons held against the driving surface of a tiltable or adjustable swashplate. A shoe or joint is located between each piston and the swashplate to allow for relative movement between the pistons and the swashplate. Each piston slidably reciprocates within a cylinder or barrel as the pistons rotate relative to the swashplate surface. As each piston retracts from the barrel, low pressure fluid is drawn into that barrel. When the piston is forced back into the barrel via interface with the swashplate, the piston pushes the fluid from the barrel at an elevated pressure. As the angle of the swashplate is changed (e.g., from a measure of 0 degrees to more than 0 degrees) the pistons correspondingly increase their stroke and thereby displace larger volumes of fluid. In the case of a pump, the larger displacement moves a larger volume of fluid to the fluid system, which means that greater fluid flow and power is transferred from the prime mover into the fluid system. In the case of a motor, the larger displacement generates greater torque and transfers a greater amount of power from the fluid system into the rotating shaft and in the process utilizes more fluid from the fluid system.

Opening of each piston cylinder to a pressure source (or pressure relief) is conventionally provided via a fixed valve plate or individual distributor valves. In some instances, electronically controlled valves have been used to optimize valve timing in variable-displacement pumps and motors. A fixed valve plate or distributor valves interfacing with a fixed valve cam presents a less complex and more compact approach. The relative rotation between that of the barrel which houses the piston and of the valve plate or valve cam determines whether the piston cylinder is opened to high pressure or tank. A typical axial-piston hydraulic motor with an adjustable swashplate and fixed valve timing (via either a valve plate or a fixed valve cam) cannot achieve ideal pre-compression and decompression across a range of operating conditions. This means that when the valve to a cylinder opens to the inlet or outlet, the pressure in the cylinder is not equal to pressure on the other side of the valve. This results in a flow spike across a larger pressure difference, causing a loss of energy due to throttling.

SUMMARY

The inventors of the present disclosure recognized that a need exists for improvements in axial piston hydraulic devices (motors, pumps and pump-motors).

Some aspects of the present disclosure entail devices and methods for improving the efficiency of an axial piston hydraulic motor or other axial piston hydraulic device. In some embodiments, a valve cam, with specified geometry, is assembled to a conventional axial piston hydraulic device (e.g., hydraulic motor, hydraulic pump, hydraulic pump-motor) in a manner permitting selective rotation of the valve cam relative to the distributor valves (e.g., spool valves). In related embodiments, the rotatable valve cam is provided in conjunction with (e.g., joint control) an adjustable swashplate. This can be done according to a mathematical relationship in order to adjust the displacement of the axial piston hydraulic motor (or other device) while maintaining optimal pre-compression and decompression across a range of operating conditions. With these and related embodiments, this configuration allows, for each desired effective displacement of the hydraulic motor, a set of optimal valve timing to achieve optimal pre-compression and decompression so as to eliminate associated throttling losses. In some examples, efficiency improvements on the order of 10% (e.g., in absolute efficiency terms, such as 75% to 85%) can be achieved.

Aspects of the present disclosure can be applied to axial piston variable displacement pumps and motors in general where cam-based distributor valves are used (vs. fixed valve plate). For example, the devices and method of the present disclosure can be useful with inline hydro-mechanical transmissions, standalone variable-displacement hydraulic motors (e.g., to improve power efficiency), etc.

In some non-limiting examples, the present disclosure provides for improvement to hydro-mechanical transmissions (HMTs). An HMT transmits power both hydraulically and mechanically, allowing higher efficiencies than hydrostatic transmissions while maintaining continuously variable transmission ratios. Ordinary HMTs consist of a hydraulic pump/motor pair in parallel with a mechanical transmission, but their large sizes and high costs are major disadvantages. As an alternative, an inline HMT (iHMT) significantly reduces the size, cost, and complexity of an HMT through an inline design that eliminates gears. However, low power efficiency is the principal barrier to its more widespread use. A dominant loss is throttling due to fluid compressibility and non-optimal valve timing, especially in the hydraulic motor. With some embodiments of the present disclosure, a method of controlling the motor displacement is provided, using a rotatable motor valve cam and check valves in conjunction with the iHMT's existing adjustable swashplate. The modifications provided by some embodiments of the present disclosure implement near optimal pre-compression and decompression and are applicable for other swashplate type hydraulic motors. By way of non-limiting example, with a known iHMT, absolute improvements in power efficiency of 9.5% at various operating conditions were achieved in performance testing with a prototype. Thus, in some non-limiting examples, aspects of the present disclosure can be applied to the hydraulic motor of an existing iHMT, requiring only modification of the cam geometry and the addition of a mechanism to rotate the cam.

BRIEF DESCRIPTION OF THE DRAWINGS

FIG. 12 lists the physical parameters used with simulations described in the Examples section;

DETAILED DESCRIPTION

Some aspects of the present disclosure relate to axial piston hydraulic devices (motors, pumps, and pump-motors) incorporating a rotatable valve cam (otherwise controlling operation of distributor valves, such as radial spool valves, provided with the device) and an adjustable swashplate to achieve improved efficiencies. While some descriptions below describe features of the present disclosure in the context of an inline hydro-mechanical transmission, the present disclosure is in no way limited to this example end-use application. In other embodiments, features of the present disclosure are equally applicable to any piston-type variable displacement hydraulic motors (and/or pumps), hydrostatic drives, hydro-mechanical transmissions, etc.

Figure 1:
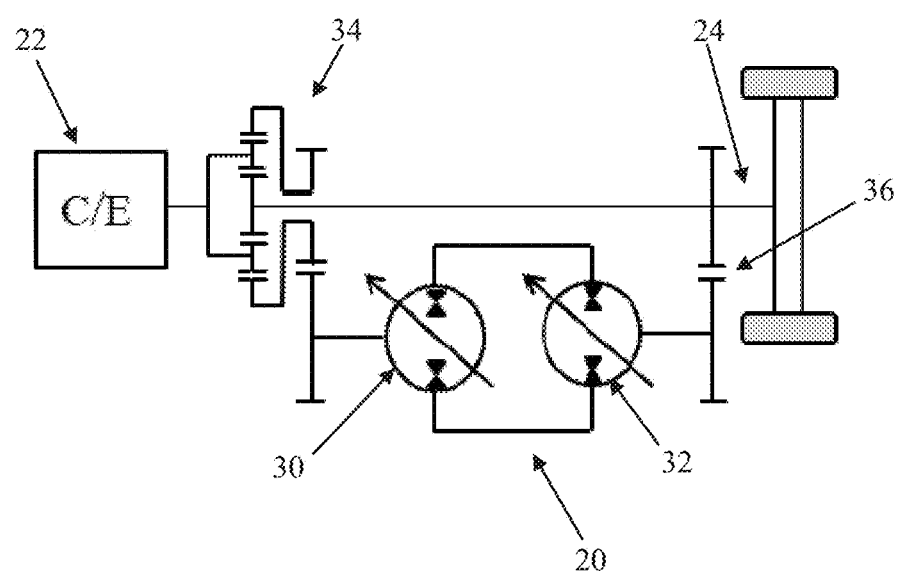
FIG. 1 is a schematic diagram of a traditional output-coupled HMT architecture.

With the above in mind, a hydro-mechanical transmission (HMT) transmits power both hydraulically and mechanically, allowing higher efficiencies (since transmitting power mechanically tends to be highly efficient) than hydrostatic transmissions while maintaining continuously variable transmission ratios. As a point of reference, a traditional output-coupled HMT architecture 20 is shown in FIG. 1 between an engine 22 and a drive drain 24, and generally consists of a hydraulic pump/motor pair 30, 32 in parallel with a mechanical transmission (typically with a planetary gear set 34 and a coupling gear 36). The large sizes and high costs associated with traditional HMT designs are major obstacles to their use in most applications.

Figure 2A:
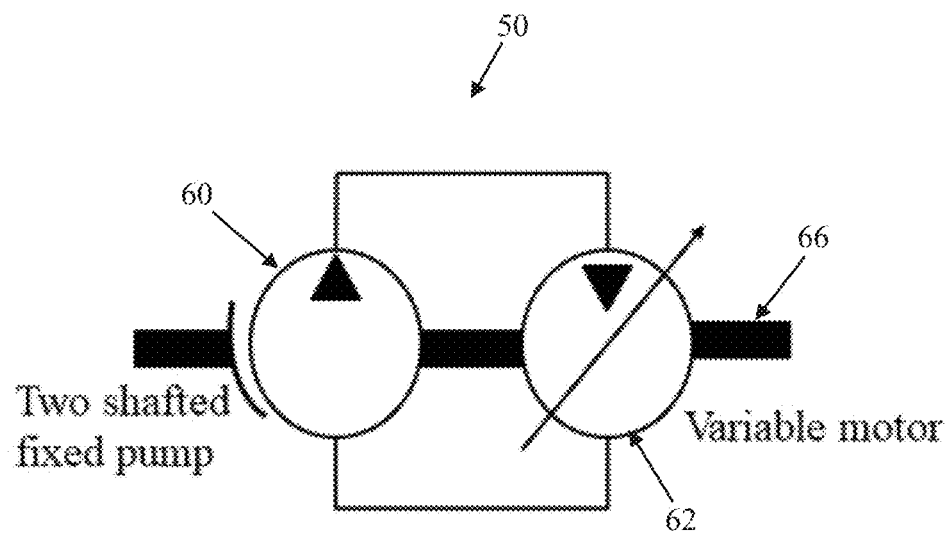
FIG. 2A is a hydraulic schematic diagram of an iHMT.
Figure 2B:
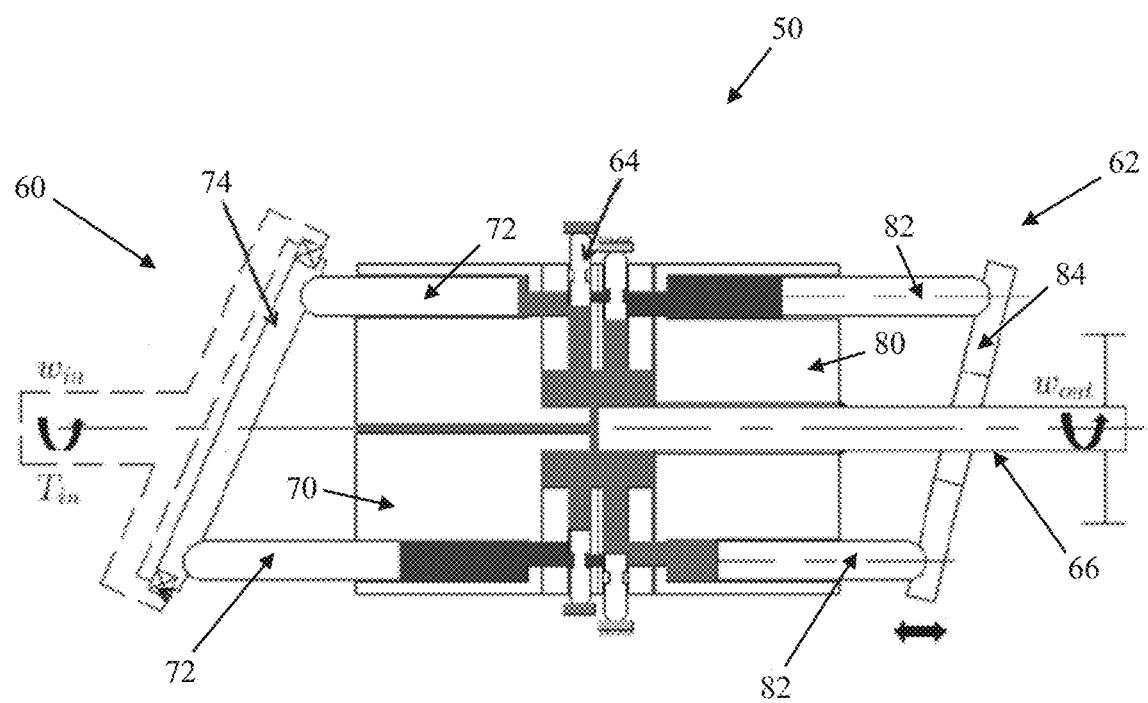
FIG. 2B is a simplified diagram of an iHMT.
Figure 2C:
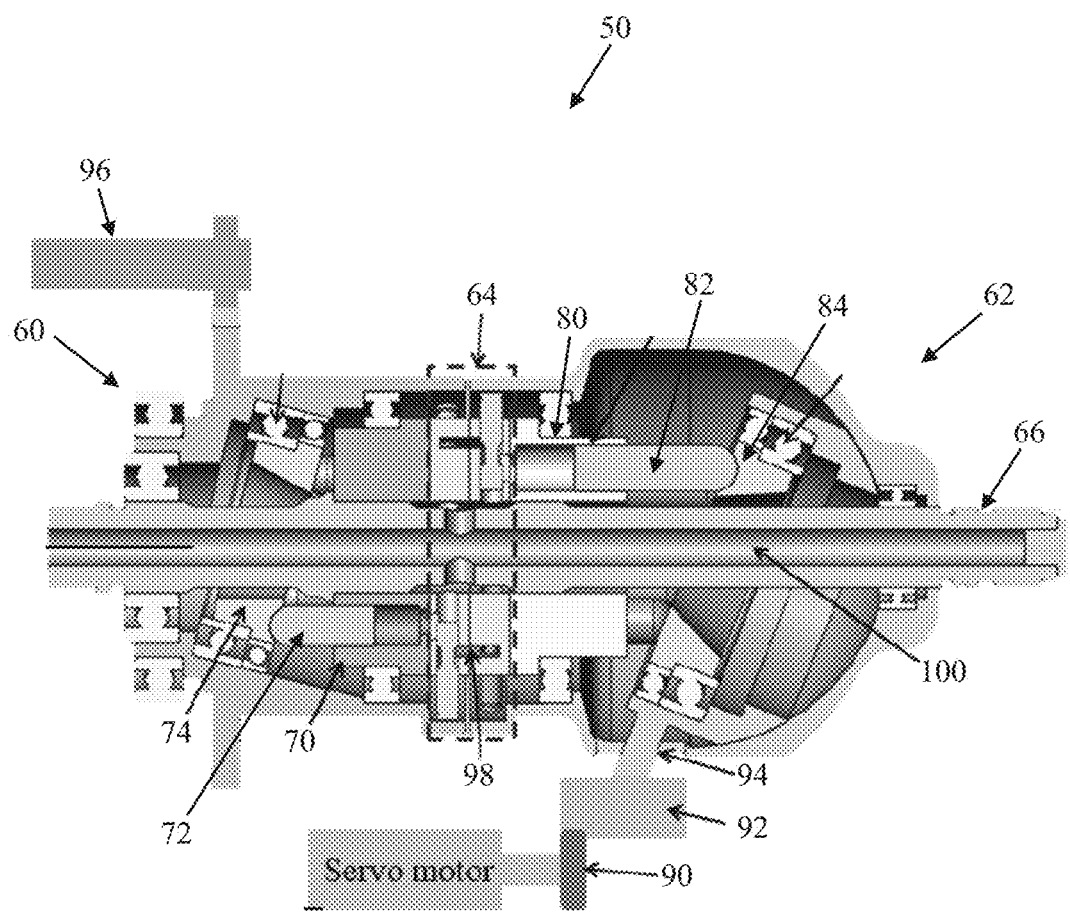
FIG. 2C is a sectional view of an iHMT.

The inline HMT (iHMT) design is alternative to the conventional HMT, and is a continuously variable transmission that significantly reduces the size and complexity of an HMT through a compact inline design that eliminates gears. The Honda Motor Co. commercialized iHMT designs under the tradename "Hondamatic". With reference to FIGS. 2A-2C, an iHMT 50 generally consists of a fixed-displacement pump 60 (e.g., a two-shafted hydraulic wobble-plate pump) and a variable-displacement motor 62 (e.g., a variable displacement hydraulic swashplate motor). The pump 60 and the motor 62 are connected hydraulically by a system of distributor valves 64, and connected mechanically by a shared central output shaft 66. The pump 60 generally includes a cylinder block or barrel 70 forming series of cylindrical bores each slidably maintaining a piston 72, along with a wobble plate 74 that dictates travel of the pistons 72 with rotation of the wobble plate 74 relative to the block 70 (and vice-versa). The motor 62 similarly includes a cylinder block or barrel 80 forming series of cylindrical bores each slidably maintaining a piston 82, along with a swashplate 84 that dictates an extent of travel for the pistons 82 with rotation of the block 80 (and vice-versa). An angle of the swashplate 84 relative to the block 80, and thus relative to the pistons 82, is adjustable, for example via servo motor-driven gears 90, a ball screw mechanism 92, and a pivot member 94. The wobble plate 74 of the pump 60 serves as the mechanical input, and the transmission ratio is adjusted by changing the angle of a swashplate 84 of the motor 62. Upon engagement, an input shaft 96 from the engine causes the wobble plate 74 to rotate, resulting in sequential stroking of the pump pistons 72. This action draws low pressure fluid into the chambers of the pistons 72. The pump pistons 72 discharge high-pressure fluid that is distributed (via a high pressure ring 98) by the distributor valves 64 to the pistons 82 of the motor 62. More particularly, the corresponding distributor valve 64 on the motor side opens and feeds the high-pressure fluid to a corresponding one of the piston chambers of the motor 62, causing the piston 82 therein to push against the swashplate 84. The cylinder block 80 holding the motor pistons 82 is coupled to the output shaft 66; thus, the pressure exerted on the swashplate 84 causes the cylinder block 80 to rotate. As the motor pistons 82 traverse through their discharge stroke, fluid is transferred back through the motor-side distributor valves 64 into a low-pressure circuit 100, returning to the pump-side distributor valves 64. When the angle of the swashplate 84 is adjusted, the cylinder block 80 (and thus the output shaft 66) rotates faster or slower, resulting in higher or lower output drive ratios. The distributor valves 64 are arranged radially around the output shaft 66. The pump-side and motor-side distributor valves 64 are eccentrically arranged on the output shaft 66 and are aligned to generally time the transfer of low-pressure and high-pressure fluid. Because the two-shafted pump 60 configuration assumes the role of a 1:1:1 planetary gear, the example iHMT 50 is in fact an output-coupled HMT as in FIG. 1.

The inline design of an iHMT (e.g., the iHMT 50) makes it more compact and less costly than ordinary hydro-mechanical transmissions. However, previous work has experimentally demonstrated power efficiencies of only 74-86% over a range of operating conditions. It is suggested that a dominant cause of power loss is fluid compressibility in the cylinders of the motor 62 and non-optimal valve timing, which lead to throttling in the distributor valves 64. Because the iHMT operates at a wide range of pressures and motor displacements, it is not possible to implement optimal precompression and decompression in the motor 62 for all operating conditions with a fixed valve cam design.

Electronically-controlled valves for each cylinder of the motor 62 would allow complete control of valve timing and a variety of more efficient displacement control strategies. They would also eliminate the need for the adjustable swashplate 84. However, the size of the electronically-actuated valves would make this approach impractical in the context of an iHMT (e.g., the iHMT 50), especially because the valves must rotate with the motor barrel 80 at output speed.

It has been suggested that solenoid-actuated valves can be compared to mechanically-actuated valves in the context of an inline-cylinder pump. The mechanical approach, based on two half-masking cams controlled by planetary gears, is an attractive method of controlling the motor displacement in an iHMT (e.g., the iHMT 50). The main obstacle to this approach in the iHMT is that its wide range of operating conditions demand a wide range of pre-compression and decompression durations at all displacements. Because of this, if masking cams were used, it would be necessary to use four masking cams controlled independently rather than by a planetary gear set.

Partial-stroke piston pressurization (PSPP) using a rotary pilot valve has been suggested, and may also improve the efficiency of the motor in the iHMT (e.g., the motor 62) across its entire range of displacements. However, the size and complexity of the pilot-operated valves, pilot valve, and provisions for supplying pilot pressure would require major modifications to the iHMT 50.

In other instances, the compressibility losses at the lock up or direct drive (zero motor displacement) condition of the iHMT were addressed using a sliding circular cam for the motor valves. In the lock up condition, the motor displacement is zero, but in the stock transmission the motor cylinder chambers are repeatedly connected to high and low pressures. The sliding circular cam introduces a mode that cuts off all flow to the motor (e.g., the motor 62) by moving to a concentric position. This would eliminate compressibility and throttling losses in the motor 62 for the direct drive case. However, compressibility losses are not addressed at other transmission ratios.

Against the above background, some aspects of the present disclosure provide a more versatile and efficient method of controlling the displacement of an axial-piston motor (e.g., the motor 62), using a rotatable motor valve cam and check valves in conjunction with an adjustable swashplate. In some embodiments, the devices and methods of the present disclosure can be applied to the motor in an iHMT (e.g., the motor 62 of the iHMT 50), an application that can benefit from efficiency improvements across the entire range of motor operating conditions. By controlling both the cam and the adjustable swashplate 84, the displacement of the motor 62 and accordingly the transmission ratio may be adjusted while maintaining near-optimal pre-compression in the motor cylinders for any operating pressure. Check valves between the motor cylinders and the hydraulic reservoir can be used to prevent cavitation in the cylinders after completely extracting the energy of the compressed fluid during decompression. The rotatable cam, check valves, and a scheme for the joint control of the valve cam and swashplate are designed and modeled with the goal of reducing compressibility and throttling losses in the iHMT across its entire range of operating conditions.

Operation of iHMT—Background

As mentioned above, the designs and methods of the present disclosure are useful with a number of different axial piston type variable displacement hydraulic motors (and/or pumps), hydrostatic drives, hydro-mechanical transmissions, etc. To provide a better understanding of any end-use implementation, certain parameters of the hydraulic device in question can be considered. With this in mind, and by way of non-limiting example, some parameters of one exemplary end-use application, the iHMT 50 are provided below. These explanations are non-limiting, and the devices and methods of the present disclosure are in no way limited to an iHMT (nor to hydro-mechanical transmissions).

In the Hondamatic iHMT, shown in FIGS. 2A-2C, the cylinders of both the pump 60 and the motor 62 are attached to the central output shaft 66. The pump 60 and the motor 62 are connected hydraulically by the high-pressure ring 98 and the low pressure ring 100. A respective one of the distributor valves 64 for each cylinder directs flow to either of these rings 98, 100, and the timing of the distributor valves 64 is controlled by eccentric circular cams in both the pump 60 and the motor 62. The wobble plate 74 of the two-shafted pump 60 acts as the mechanical input to the transmission 50, where Win is the speed of the wobble plate 74 and $\omega_{out}$ is the speed of the pump's piston barrel 70, the effective speed of the pump 60 is $\omega_{in}-\omega_{out}$. The adjustable motor swashplate 84 does not rotate, so the effective speed of the motor 62 is coma.

As both the pump and the motor's piston cylinders 72, 82 are connected to the high pressure and low pressure rings 98, 100 with constant volumes, at large motor displacements, the motor 62 will consume more fluid from the pump 60 in each rotation. If $\omega_{in}$ is held constant, either the speed of the pump 60 will increase or the speed of the motor 62 (i.e., the output speed) will decrease, thus increasing the transmission ratio. Likewise, a decrease in motor displacement will cause either an increase in output speed or a decrease in transmission ratio.

If leakage and fluid compressibility are ignored, a motor displacement of zero will completely prevent flow from the pump 60, therefore reducing the pump speed to zero. In this case, the output speed $\omega_{out}$ will be equal to the input speed $\omega_{in}$.

From the architecture of the transmission, flow rates of the pump 60 and of the motor 62 can be determined, respectively, as:

$$Q_{pump} = \frac{D_{pump}}{2\pi}(\omega_{in} - \omega_{out}) \qquad (1)$$

$$Q_{motor} = \frac{D_{motor}(t)}{2\pi}\omega_{out}$$

Because the inlets and outlets of the pump 60 and the motor 62 are directly connected, $Q_{pump}=Q_{motor}$ in the steady state. Solving for $\omega_{in}/\omega_{out}$, the ideal transmission ratio can be determined as:

$$i_{ideal} = \frac{\omega_{in}}{\omega_{out}} = \frac{T_{in}}{T_{out}} = \frac{D_{pump} + D_{motor}(t)}{D_{pump}} \qquad (2)$$

Conventional iHMTs (e.g., stock Hondamatic-type iHMT) use fixed eccentric circular valve cams for both the motor 62 and the pump 60 to control when the cylinders are connected to the high pressure and the low pressure rings 98, 100. For the hydraulic motor 62, the low-pressure valve is closed prior to top-dead-center (TDC), at angle $\theta_{ps}$, to allow the fluid remaining in the cylinder to be pre-compressed to the pressure in the high-pressure ring before the high-pressure valve is open at $\theta_{pe}$. This is known as pre-compression. Similarly, the high-pressure valve is closed prior to the bottom-dead-center (BDC), at angle $\theta_{ds}$, to allow the high pressure fluid to expand to the pressure of the low-pressure ring before the low-pressure valve opens at $\theta_{de}$. This is known as decompression. Improper pre-compression and decompression, which occur when the cylinder pressure is not equal to the pressure in the ring when the valve is opened, lead to additional throttling loss through the valves.

Figure 3:
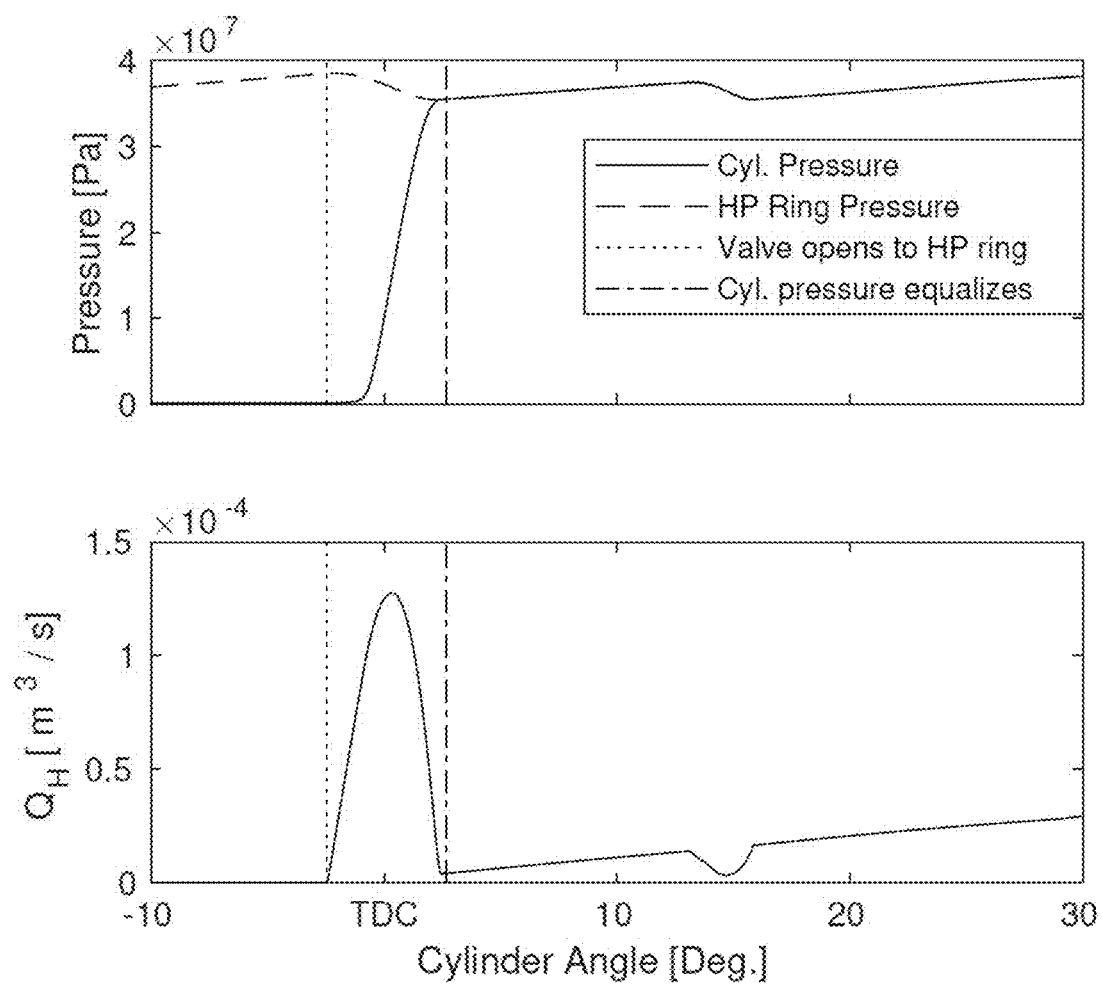
FIG. 3 presents graphs of simulated cylinder pressure and flow from the high pressure ring in an iHMT operating at full displacement and demonstrating insufficient pre-compression.
Figure 4:
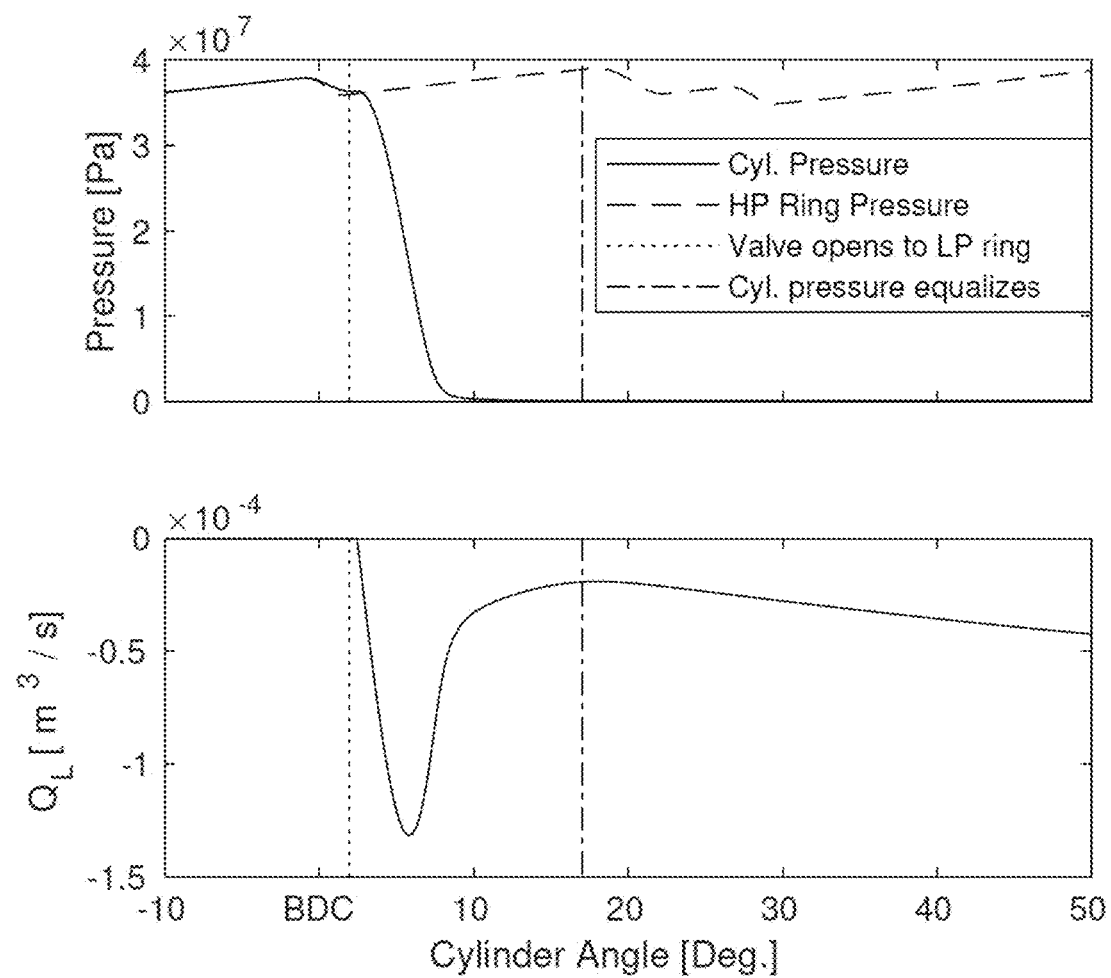
FIG. 4 presents graphs of simulated cylinder pressure and flow from the low pressure ring in an iHMT operating at full displacement and demonstrating insufficient decompression.

With a fixed valve cam, the angles $\theta_{ps}$, $\theta_{pe}$, $\theta_{ds}$, $\theta_{de}$ are fixed, so it is not possible to achieve optimal pre-compression and decompression at all motor swashplate 84 angles $\alpha_{sw}$ (which varies both the volume of fluid that requires pre-compression or decompression and the actual change in volume during pre-compression or decompression), or as the transmission operating pressure $P_g$ deviates from the design condition of the cam. Examples of improper pre-compression and decompression with the stock eccentric circular valve cam are shown in FIGS. 3 and 4, in which large throttling flows are evident as pressures equalize.

Pre-compression and decompression are more of an issue for the hydraulic motor 62 than for the pump 60 because the displacement of the pump 60 is fixed. This means that only the operating pressure $P_g$ will affect the amount of required pre-compression and decompression in the pump. As a result, near-perfect pre-compression and decompression are attainable in the pump across a range of operating conditions with a fixed valve cam. The present disclosure provides devices and methods for modifying the motor valve timing.

Devices/Methods—Rotatable Cam and Low-Pressure Check Valves

Figure 5:
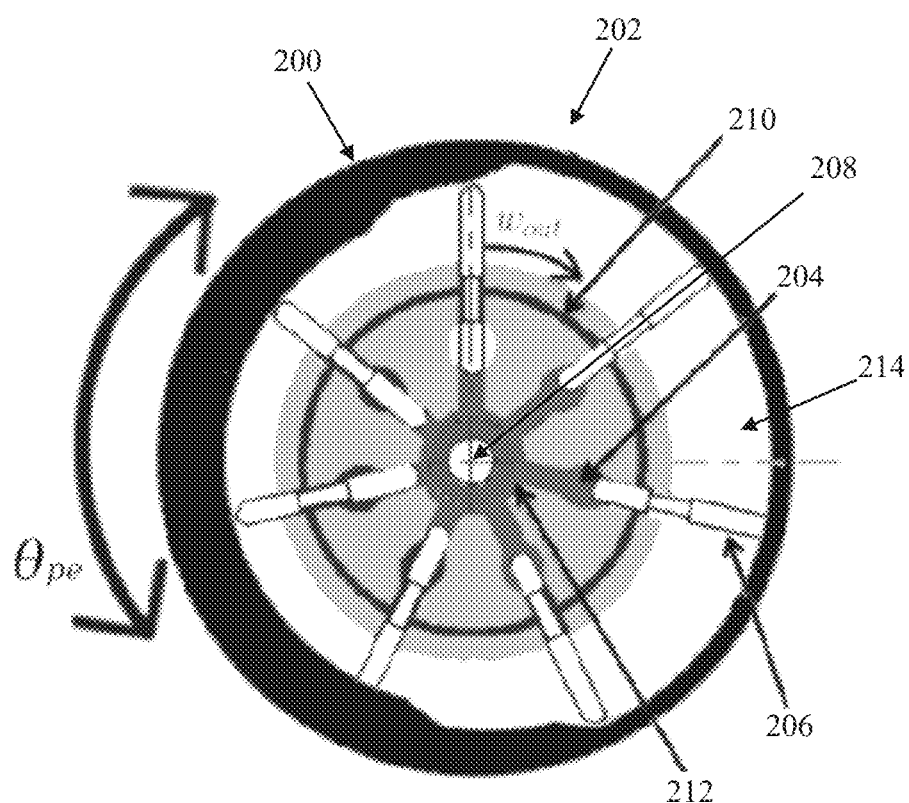
FIG. 5 is a simplified representation of an axial piston hydraulic device including a rotatable distributor valve cam in accordance with principles of the present disclosure.

Some aspects of the present disclosure provide or include modifications to an axial piston hydraulic motor or other device, such as the hydro-mechanical transmission 50 above, and can include a rotatable cam. One example of a cam 200 of the present disclosure is shown in FIG. 5, arranged to control operation of the distributor valves (e.g., spool valves) of an axial piston hydraulic motor 202. As a point of reference, the motor 202 can be akin to the motor 62 (FIGS. 2A-2C) described above, and generally includes a barrel or cylinder block forming bores each slidably maintaining a piston 204. Distributor valves 206 are arranged radially around a centerline (or central shaft) 208 of the motor 202, and are operable to selectively connect corresponding ones of the piston chambers 204 to a high pressure passage 210 and a low pressure passage 212. The cam 200 is mounted so as to be selectively rotated relative the distributor valves 206 as described in greater detail below. It will be understood that during normal operation, the distributor valves 206 will rotate relative to the cam 200 (with a shape of the cam 200 dictating an operational state of each of the distributor valves 206 at any point in time). In some embodiments, with the modified transmissions of the present disclosure (e.g., the modified transmission of FIG. 5), the profile of the motor valve cam 200 is first designed to achieve optimal pre-compression and decompression for the full displacement condition. Moreover, instead of being fixed to the transmission housing 214 (referenced generally), it is allowed to be rotated about the central shaft 208 in order to apply a variable advance to the valve timing for different pressure and displacement conditions. Controlled rotation of the cam 200 relative to the distributor valves 206 can be provided in a variety of fashions as will be understood by one of ordinary skill, for example a gear/stepper motor mechanism.

Figure 6:
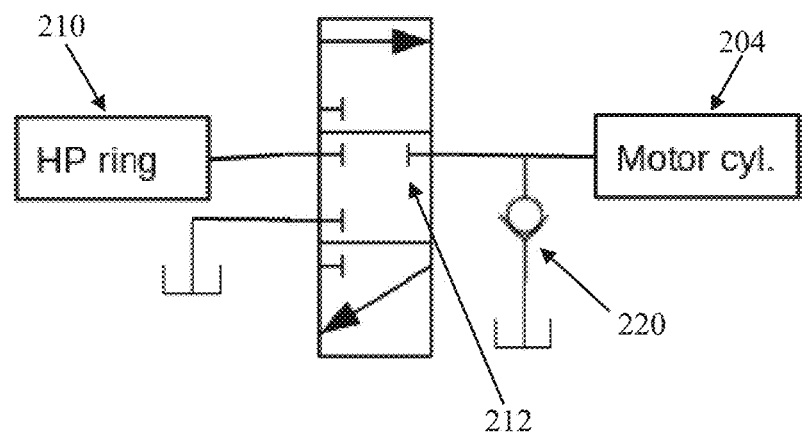
FIG. 6 is a schematic diagram of a check valve between a motor cylinder and the low pressure reservoir in accordance with principles of the present disclosure.

In some embodiments, the motor valve cam 200 can be designed and controlled in conjunction with the adjustable swashplate (e.g., the swashplate 84 (FIGS. 2B and 2C)) to optimize pre-compression. Because rotation of the cam 200 imposes the same shift in valve timing for both pre-compression and decompression, it is not possible to optimize both pre-compression and decompression for a range of swashplate angles $\alpha_{sw}$. In some embodiments, the devices and methods of the present disclosure provide proper pre-compression using cam rotation, and proper decompression with the addition of check valves between the motor cylinders and the low pressure reservoir as represented by FIG. 6 (in which a check valve 220 is provided between one of the motor cylinders/piston chambers 204 and the low pressure passage 212). In some examples, and based on physical constraints, it may be more feasible to introduce a passage with check valves from the cylinders to the low pressure reservoir than to the high pressure ring.

Returning to FIG. 5, when the cam 200 is rotated to advance valve timing, each cylinder 204 is connected to the high-pressure ring or passage 210 prior to TDC, and is also disconnected from the high-pressure ring 210 earlier than if the cam 200 were not rotated. This reduces the net amount of high-pressure fluid that enters the cylinder 204 in each stroke, and thereby reduces the motor's effective displacement. The actual effective displacement of the motor 202 is a function of both the swashplate angle $\alpha_{sw}$ and the cam rotation.

Figure 7:
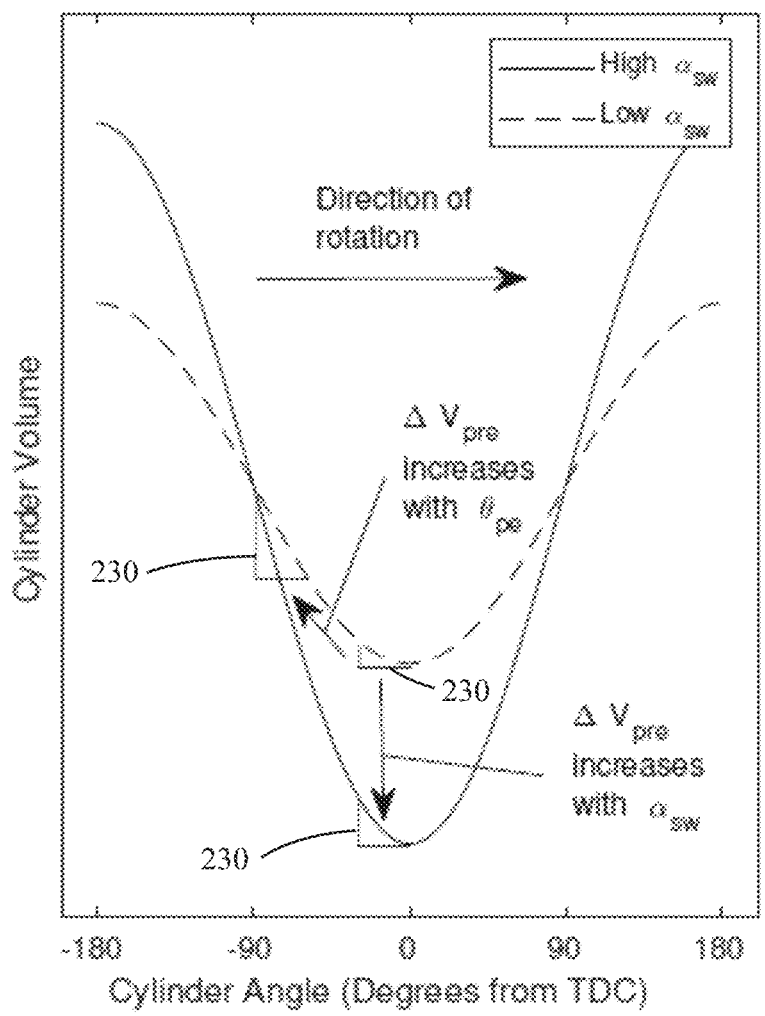
FIG. 7 is a graph illustrating effects of swashplate angle and cam angle on the change in cylinder volume during pre-compression, $\Delta V_{pre}$ increases with both $|\theta_{pe}|$ and $\alpha_{sw}$.

FIG. 7 illustrates one example methodology of the present disclosure for computing the required cam rotation to achieve optimal pre-compression. With cross-reference between FIGS. 5 and 7, suppose that the optimal pre-compression duration (indicated by the width of the triangles labeled at 230), ending at TDC, has already been obtained for maximum motor displacement. When the motor swashplate angle $\alpha_{sw}$ is reduced, the residual cylinder volume is increased and the change in volume during pre-compression (i.e., the height of the triangle) is decreased. Because of this, applying the same pre-compression duration at the same cylinder angle may not be sufficient. However, if the cam 200 is rotated so that pre-compression occurs sooner, the change in volume during pre-compression will be larger even though the angular duration of pre-compression is unchanged. For a particular swashplate angle $\alpha_{sw}$, the required cam rotation may be found that enables the cylinder pressure to reach that of the high-pressure ring 210 at the end of pre-compression.

To compute the required cam rotation, the following assumptions can be made of the working fluid:
1. It is a mixture of pure oil with a constant bulk modulus β and a fixed mass of entrained air (entrained air does not go in/out of solution).
2. The entrained air volume fraction in the working fluid is α at atmospheric pressure $P_0$.
3. The entrained air is an ideal gas undergoing adiabatic compression/expansion Qualitatively, advancing $\theta_{pe}$ increases both the volume change during pre-compression $\Delta V_{pre}$ and the fluid volume to be pre-compressed $V_{ps}$. This also decreases the effective motor displacement $D_{motor}$ and transmission ratio $i_{ideal}$. On the other hand, decreasing the swashplate angle $\alpha_{sw}$ decreases $D_{motor}$ and $i_{ideal}$ but also decreases $\Delta V_{pre}$ and increases $V_{ps}$. Hence, by the proper combinations of $\alpha_{sw}$ and $\theta_{pe}$, a range of transmission ratios can be achieved while maintaining proper pre-compression.

Figure 8:
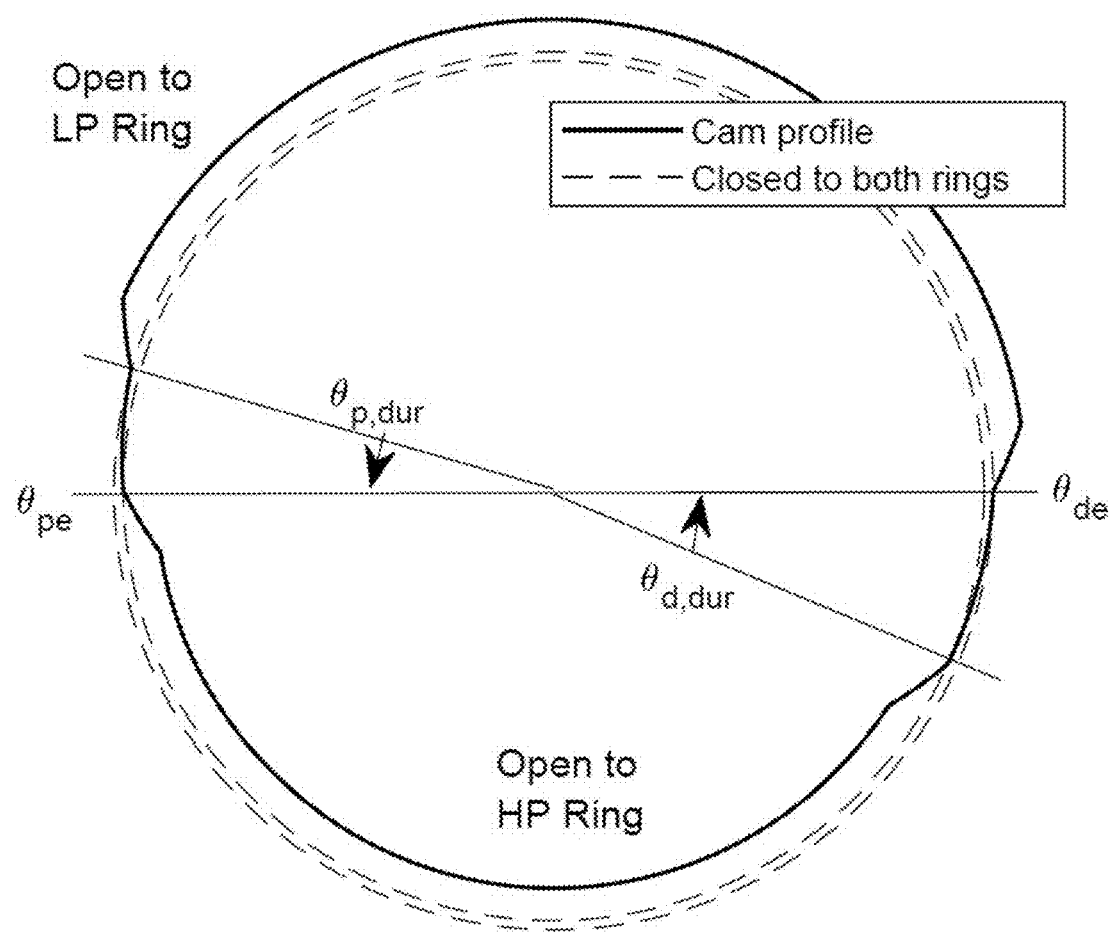
FIG. 8 illustrates theoretical cam profile in accordance with principles of the present disclosure, with $\theta_{pe}=0$.

Some aspects of the present disclosure include methods for generating or designing the rotatable cam (e.g., the cam 200) as described above for a particular end-use application. In some embodiments, to achieve maximum motor displacement, $\alpha_{sw}$ can be set to $\alpha_{sw,max}$ (the maximum swashplate angle) and $\theta_{pe}$ can be at 0° (TDC). Therefore, the pre-compression duration $\theta_{p,dur}$ of the cam, a profile of which is shown in FIG. 8 relative to the high pressure passage ("HP Ring") and the low pressure passage ("LP Ring), can be designed for the maximum displacement operating condition.

Similarly, the decompression duration $\theta_{d,dur}$ of the cam can be designed for the maximum displacement case. To ensure complete decompression, the actual change in volume during decompression $\Delta V_{de}$ must equal or exceed the required change $\Delta V_{de,reqd}$ at any operating condition. If $\Delta V_{de}$ exceeds $\Delta V_{de,reqd}$, the check valve will allow flow from the low-pressure ring to the cylinder, thus preventing cavitation.

To achieve a full motoring stroke, the angles $\theta_{pe}$ and $\theta_{de}$ must be 0° (TDC) and 180° (BDC), respectively. This leaves the two parameters $\theta_{p,dur}$ and $\theta_{d,dur}$ to be selected based on the motor geometry and fluid compressibility.

Assuming that the high-pressure ring is at gage pressure $P_g$, the optimal change in volume during pre-compression at full displacement can be determined as:

$$\Delta V_{reqd|full\ disp.} = V_0 \cdot \left(1 - \frac{1}{r_v}\right) \tag{3}$$

where $V_0$ is the cylinder volume at TDC and $r_v$ is the volume ratio of the working fluid between $P_g$ and tank pressure. The volume ratio $r_v$ can be determined as:

$$r_v = \frac{e^{-P_g/\beta} + \alpha r^{-1/\gamma}}{1+\alpha} \tag{4}$$

and $\alpha$ is the volume fraction of entrained air. From the geometry of the motor, with $A_p$ being the piston area and $D/2$ being the distance between the cylinder and the center of the barrel, $$\Delta V_{pre|full\ disp.} = \frac{A_p D}{2} \tan(\alpha_{sw,max}) \cdot (\cos(\theta_{p,dur}) - 1) \tag{5}$$

Setting $\Delta V_{pre|full\ disp.} = \Delta V_{reqd|full\ disp.}$ results in:

$$\theta_{p,dur} = \arccos\left(1 + \frac{2V_0\left(1 - \frac{1}{r_v}\right)}{A_p D \tan\alpha_{sw,max}}\right) \tag{6}$$

By the same approach, it can be determined that:

$$\theta_{d,dur} = \arccos\left(\frac{2(r_v - 1)V_0}{A_p D \tan\alpha_{sw,max}} + 2r_v - 1\right) \tag{7}$$

With the specification of $\theta_{pe}=0°$, $\theta_{de}=180°$, $\theta_{p,dur}$ from Equation (6), and $\theta_{d,dur}$ from Equation (7), the entire cam profile can be specified.

For a given swashplate angle $\alpha_{sw}$, there is a corresponding optimal angle of cam rotation $\theta_{pe}$ that achieves optimal pre-compression. Equivalently, for each cam rotation $\theta_{pe}$, there is a corresponding optimal swashplate angle $\alpha_{sw}$. Some non-limiting examples of the present disclosure pursue the latter approach.

Given $\theta_{pe}$ and $\alpha_{sw}$, considering the motor kinematics, the cylinder volume at the end of pre-compression is:

$$V_{pe} = V_0 + \frac{A_p D}{2}[\tan(\alpha_{sw,max}) - \tan(\alpha_{sw})\cos(\theta_{pe})] \tag{8}$$

where $V_0$ is the minimum dead volume (i.e., the cylinder volume at TDC with $\alpha_{sw}=\alpha_{sw,max}$. To achieve optimal pre-compression, the required volume change during pre-compression can be determined as:

$$\Delta V_{reqd} = V_{pe} \cdot \left(1 - \frac{1}{r_v}\right) \tag{9}$$

where $r_v$ is the volume ratio from Equation (4). On the other hand, the actual volume change available during decompression can be determined as:

$$\Delta V_{pre} = \frac{A_p D}{2}\tan(\alpha_{sw})[\cos(\theta_{pe} - \theta_{p,dur}) - \cos(\theta_{pe})] \tag{10}$$

Equating $\Delta V_{pre}$ and $\Delta V_{reqd}$ provides:

$$\frac{A_p D}{2}\tan(\alpha_{sw}) \cdot (\cos(\theta_{pe} - \theta_{p,dur}) - \cos(\theta_{pe})) = \tag{11}$$
$$\left(V_0 + \frac{A_p D}{2}[\tan(\alpha_{sw,max}) - \tan(\alpha_{sw})\cos(\theta_{pe})]\right) \cdot \left(1 - \frac{1}{r_v}\right)$$

Solving Equation (11) for $\alpha_{sw}$ as a function of $\theta_{pe}$ provides:

$$\alpha_{sw}(\theta_{pe}) = \arctan\frac{\left(1 - \frac{1}{r_v}\right) \cdot (2V_0 + A_p D \tan\alpha_{sw,max})}{A_p D\left[\cos(\theta_{pe} - \theta_{p,dur}) - \frac{1}{r_v}\cos\theta_{pe}\right]} \tag{12}$$

Both the valve cam rotation angle and the swashplate angle affect the effective displacement of the motor, and accordingly the transmission ratio of the iHMT (with non-limiting examples in which the cams of the present disclosure are utilized with the axial piston hydraulic motor of an iHMT).

Figure 9:
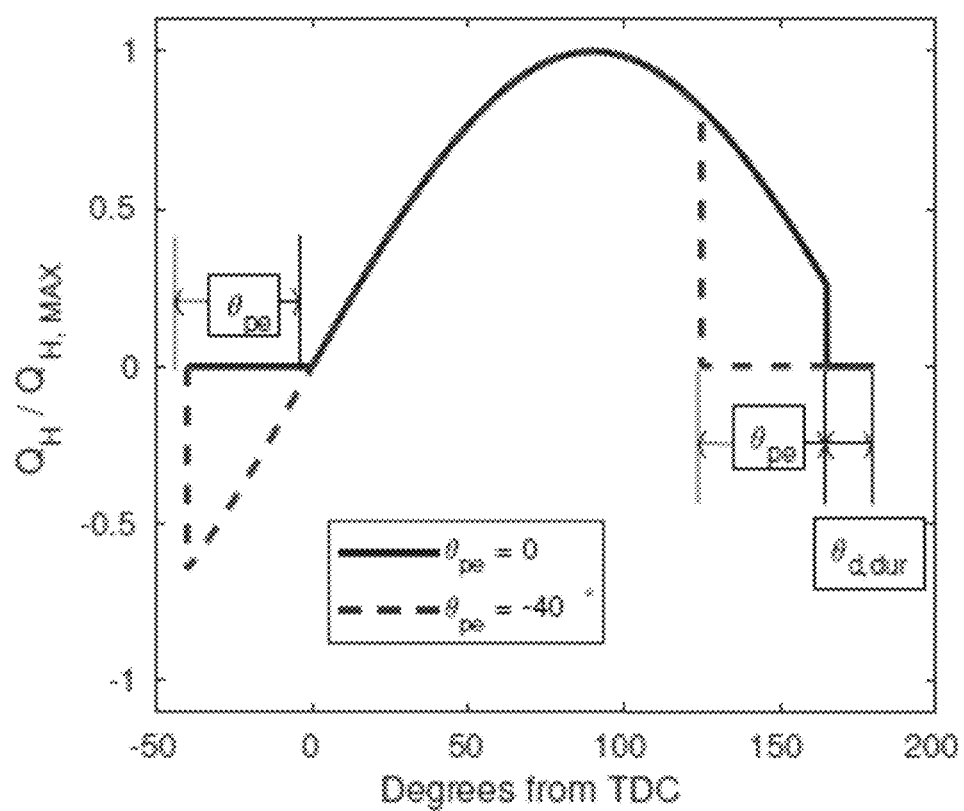
FIG. 9 is a graph illustrating high pressure flow rates, normalized by maximum flow rate, for one cylinder at 0° and −40° cam rotations.

For each motor swashplate angle $\alpha_{sw}$, the optimal cam rotation angle $\theta_{*pe}$ can be computed as the inverse of Equation (12). To quantify the effect of $\theta_{pe}$ on the effective motor displacement, the net flow between the high pressure ring and one motor cylinder can be examined. FIG. 9 illustrates the effect of cam rotation on the flow rate from the high pressure ring to one motor cylinder, $Q_H$, over one motoring stroke. Specifically, when the cam is rotated, the net motoring flow is decreased because the piston is pumping between $\theta_{pe}$ and 0°, and also because the piston stroke is shortened.

The effective motor displacement can be calculated to be:

$$D_{motor} = k_{cam} \cdot k_{sw} \cdot D_{motor,max} \quad (13)$$

$$D_{motor,max} = A_p D\tan(\alpha_{sw,max})$$

$$k_{sw} = \frac{\tan(\alpha_{sw})}{\tan(\alpha_{sw,max})}$$

$$k_{cam} = \frac{\cos(\theta_{d,dur} - \theta *_{pe}) + \cos(\theta *_{pe})}{\cos(\theta_{d,dur}) + 1}$$

where $D_{motor,max}$ is the maximum motor displacement and $k_{sw}$ and $k_{cam}$ are the effects of the swashplate angle and cam rotation on the displacement, respectively. Equation (13) can be substituted in Equation (2) to find the effective transmission ratio from a swashplate angle $\alpha_{sw}$ and its corresponding $\theta_{*pe}$.

Examples

Embodiments and advantages of features of the present disclosure are further illustrated by the following non-limiting examples. The particular materials and amounts thereof recited in these examples, as well as operating conditions and details, should not be construed to unduly limit the scope of the present disclosure.

The design procedures explained above were applied to the iHMT transmission 50 (FIGS. 2A-2C) described above using its measured dimensions.

A cam profile was designed by optimizing the angular durations of pre-compression and decompression with an objective of minimizing simulated energy loss over a range of operating conditions, as operated according to the relationship prescribed in Equation (12).

Figure 10A:
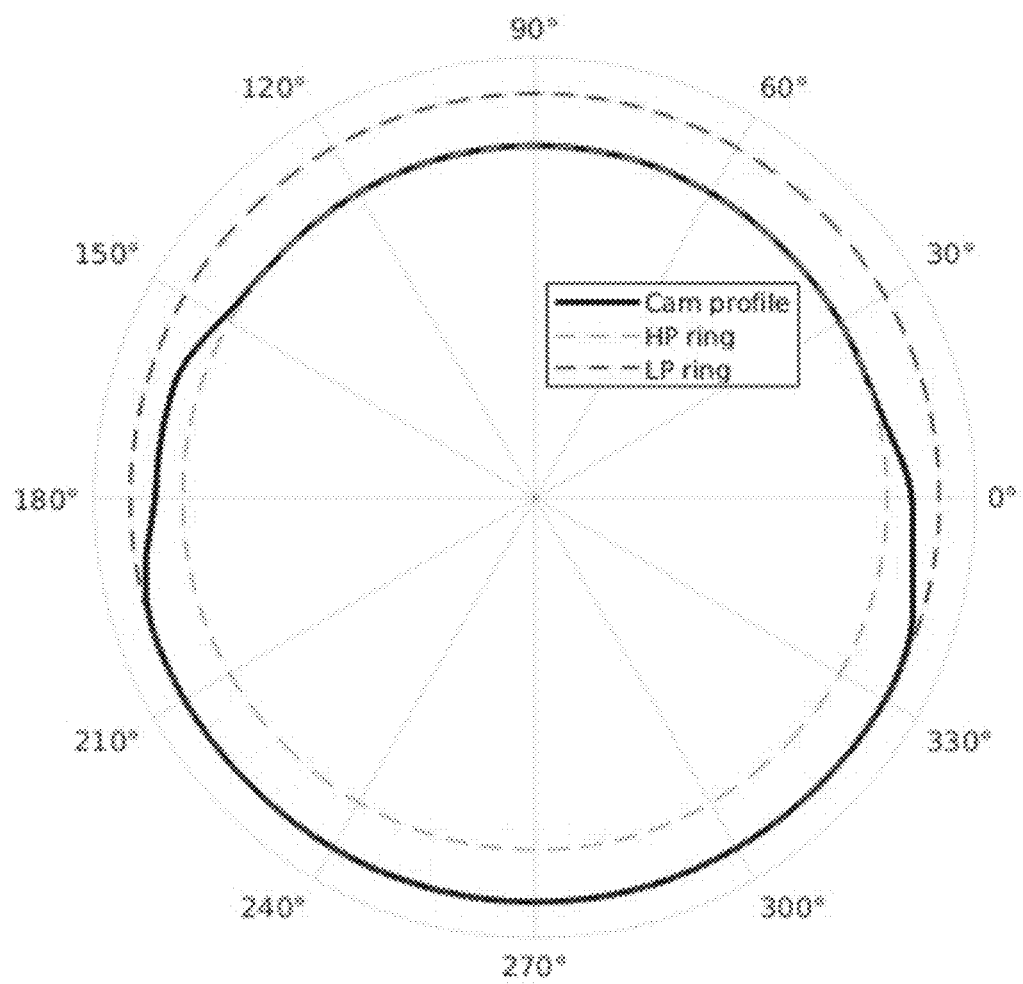
FIG. 10A is an illustration of an optimized cam profile described in the Examples section.
Figure 10B:
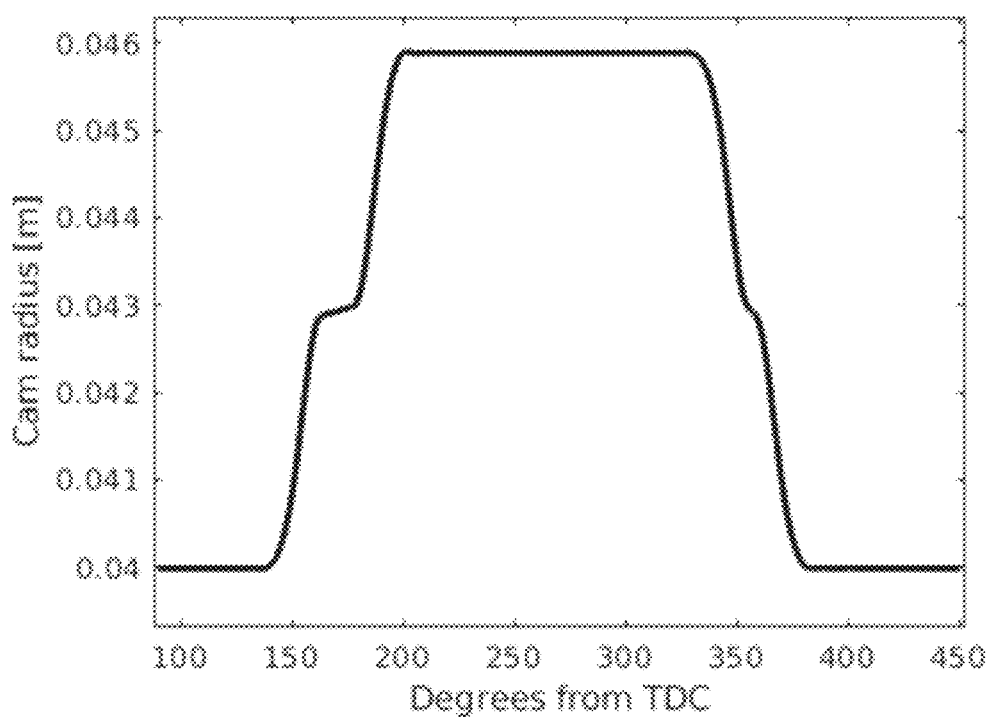
FIG. 10B is a graph illustrating a relationship of cam profile radius of the optimized cam profile described in the Examples section with degrees from top dead center.

In creating the theoretical cam profile shown in FIG. 8, a piecewise polar cubic spline was created. The spline was designed to pass through control points that determined the beginning and end of pre-compression and decompression strokes. A representation of the optimized cam profile is shown in FIG. 10A; a relationship of the radius of the cam profile relative to degrees from top dead center (TDC) is provided in FIG. 10B.

The relationship between $\alpha_{sw}$ and $\theta_{pe}$ were obtained from Equation (12). Using Equations (12) and (13), these can then be expressed in terms of the transmission ratio $i_{ideal}$. The optimal swashplate angle $\alpha_{sw}$ and cam rotation $\theta_{pe}$ are shown as functions of the transmission ratio in FIG. 11 for operating pressures of 20 MPa and 40 MPa (in the view of FIG. 11, solid lines are with operating pressure $P_g$=20 MPa and dashed lines are with $P_g$=40 MPa). It was observed that, for the same desired transmission ratio, a higher operating pressure requires more cam rotation and a smaller swashplate angle. Also, at the lock-up condition ($i_{ideal}$=1), which requires $D_{motor}$=0, a cam rotation of nearly −80° is required but the swashplate angle is not 0. This is because pre-compression is still necessary, although the net flow is zero.

Previous work has demonstrated experimentally that the total power efficiency of a stock Hondamatic iHMT is in the range of 0.70 to 0.86 at most operating conditions.

To evaluate the effect of the modified design on power efficiency, lumped-parameter simulation models were developed in MathWorks Simulink for the stock transmission with an eccentric circular cam and for the modified transmission with the rotatable cam. Physical parameters used in the simulations are shown in FIG. 12, were based on measurements of a stock transmission, and include both orifice and laminar leakage in the motor cylinders. The check valves for each motor cylinder of the modified transmission were modeled in the configuration shown in FIG. 6. Frictions at rotating and sliding interfaces were neglected in the simulation.

FIGS. 3 and 4 show the in-cylinder pressure and flow during near TDC and BDC for the motor of the stock Hondamatic iHMT (prior to the modifications of the Examples section). The stock motor has insufficient pre-compression and decompression at most operating conditions. As shown in FIG. 3, this causes a spike in flow across a large pressure difference from the high-pressure ring to the cylinder at the beginning of each motoring stroke. Similarly, in FIG. 4, insufficient decompression causes throttling energy loss across the valve to the low-pressure ring, rather than allowing the energy of the compressed fluid to be captured by the retracting piston.

Figure 13:
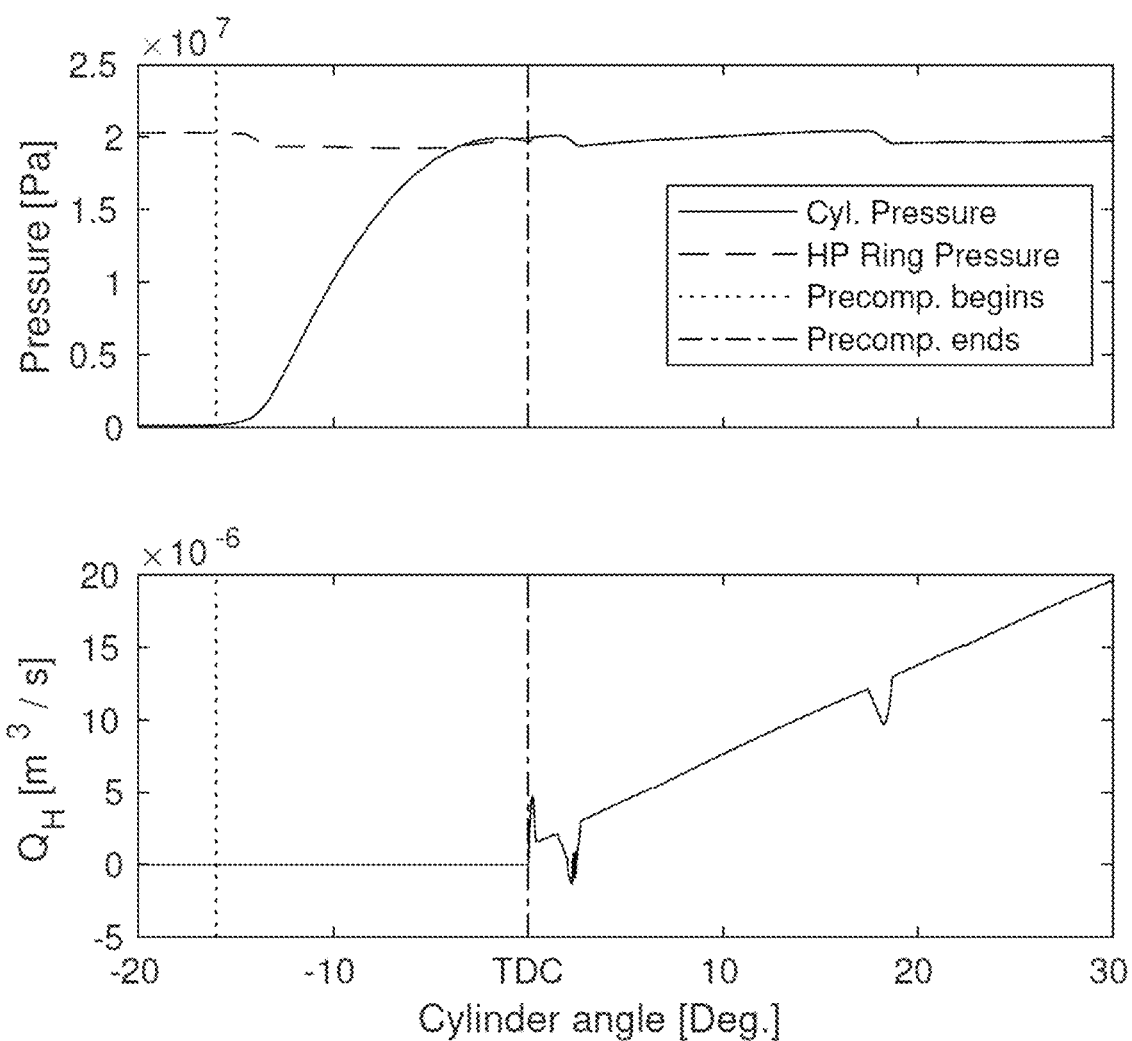
FIG. 13 presents plots of simulated cylinder pressure and flow from the high pressure ring in the modified iHMT of the Examples section and operating at full displacement.
Figure 14:
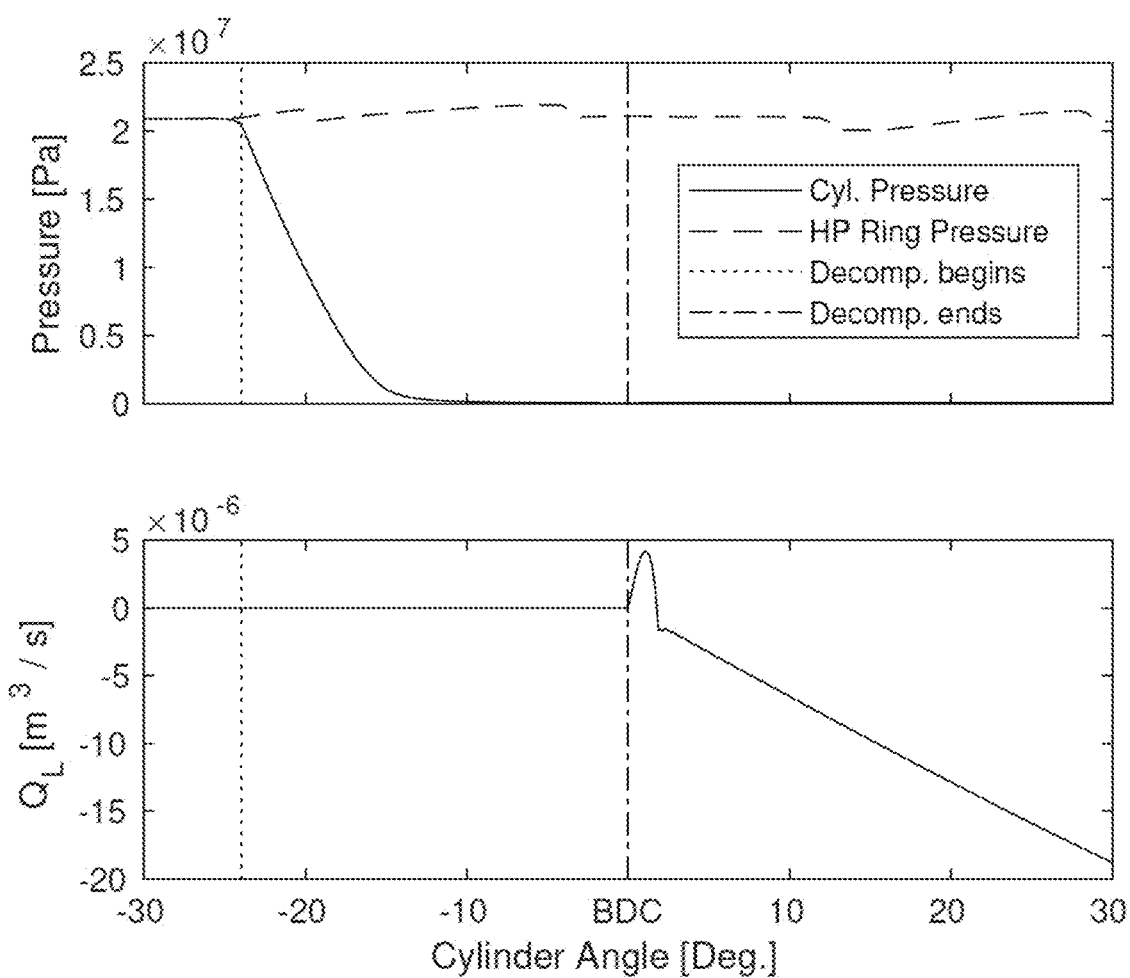
FIG. 14 presents plots of simulated cylinder pressure and flow from the low pressure ring in the modified iHMT of the Examples section and operating at full displacement.

FIGS. 13 and 14 show the results of simulations for the modified transmission of the Examples section under the same operating conditions as the stock Hondamatic iHMT of FIGS. 3 and 4. FIG. 13 reports simulated cylinder pressure and flow from the high pressure ring with the modified motor operating at full displacement; FIG. 14 reports simulated cylinder pressure and flow from the low pressure ring with the modified motor operating at full displacement. The large flow spikes in FIGS. 3 and 4 are eliminated using the rotatable cam. Very small flow spikes do occur in the modified motor: these are due to leakage, which slightly reduces the cylinder pressure at the end of both the pre-compression and decompression.

Figure 15:
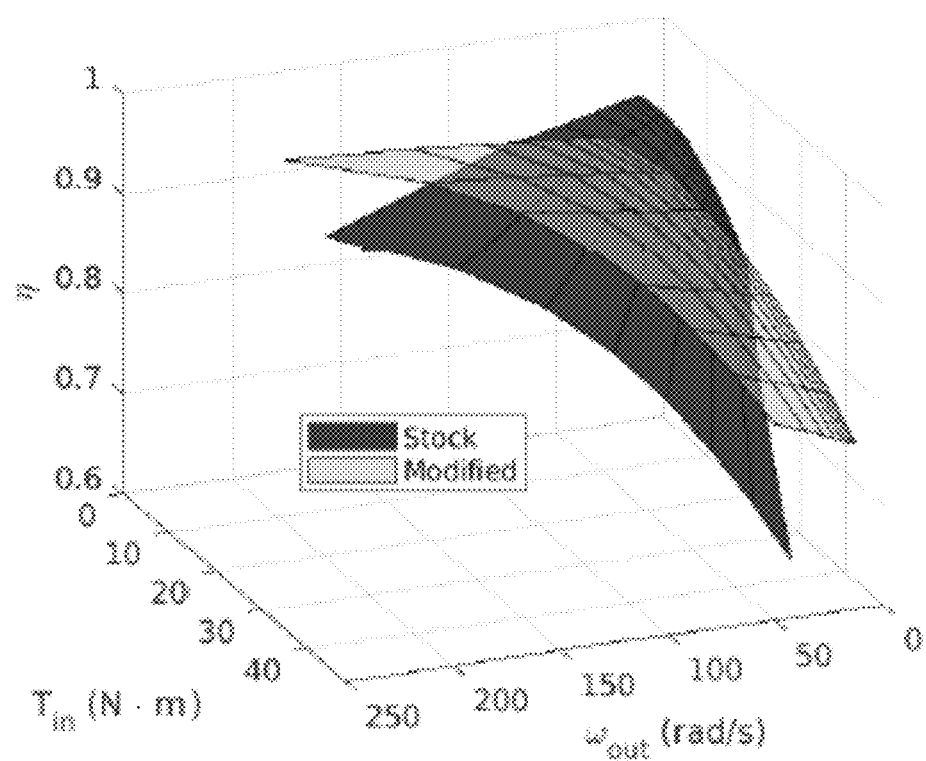
FIG. 15 presents the results of modeled power efficiency $\eta$ as a function of $\omega_{out}$ and $T_{in}$ at $P_{in}=3$ kW of the Examples section.

The stock and modified transmissions were simulated with a range of input powers, input speeds and transmission ratios. The total power efficiency was computed using method described in Barkei, J. et al., "Improving the efficiency of a compact inline hydro-mechanical transmission (iHMT) at lock-up", *Proceedings of ASME/BATH* 2021 *Symposium on Fluid Power and Motion Control* (October 2021), the entire teachings of which are incorporated herein by reference. This method accounts for stored energy in the fluid due to compressibility. Results were recorded at each operating condition, resulting in the plot shown in FIG. 15.

Figure 16:
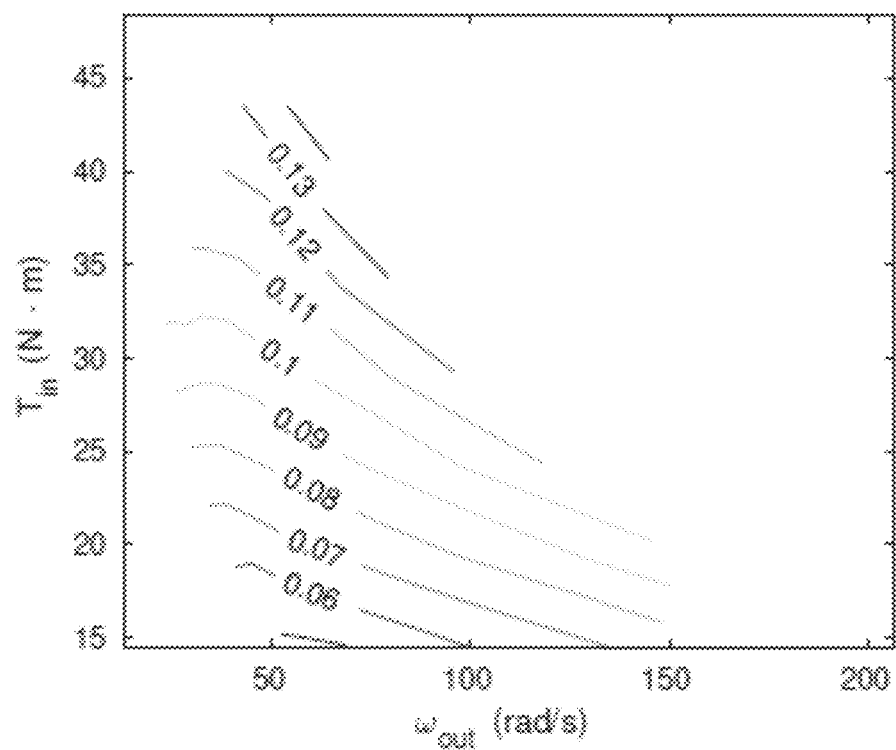
FIG. 16 is a plot of modeled power efficiency improvement $\Delta\eta$ of the modified iHMT described in the Examples section as a function of $\omega_{out}$ and $T_{in}$ at $P_{in}=3$ kW.

The modifications described above resulted in an average simulated efficiency improvement of 4.2%. Maximum efficiency improvements were on the order of 11%, which were observed at the maximum $T_{in}$/minimum $\alpha_{sw}$ operating conditions. The efficiency improvement $\Delta\eta$ is shown in FIG. 16 as a function of $\omega_{out}$ and $T_{in}$.

Figure 17:
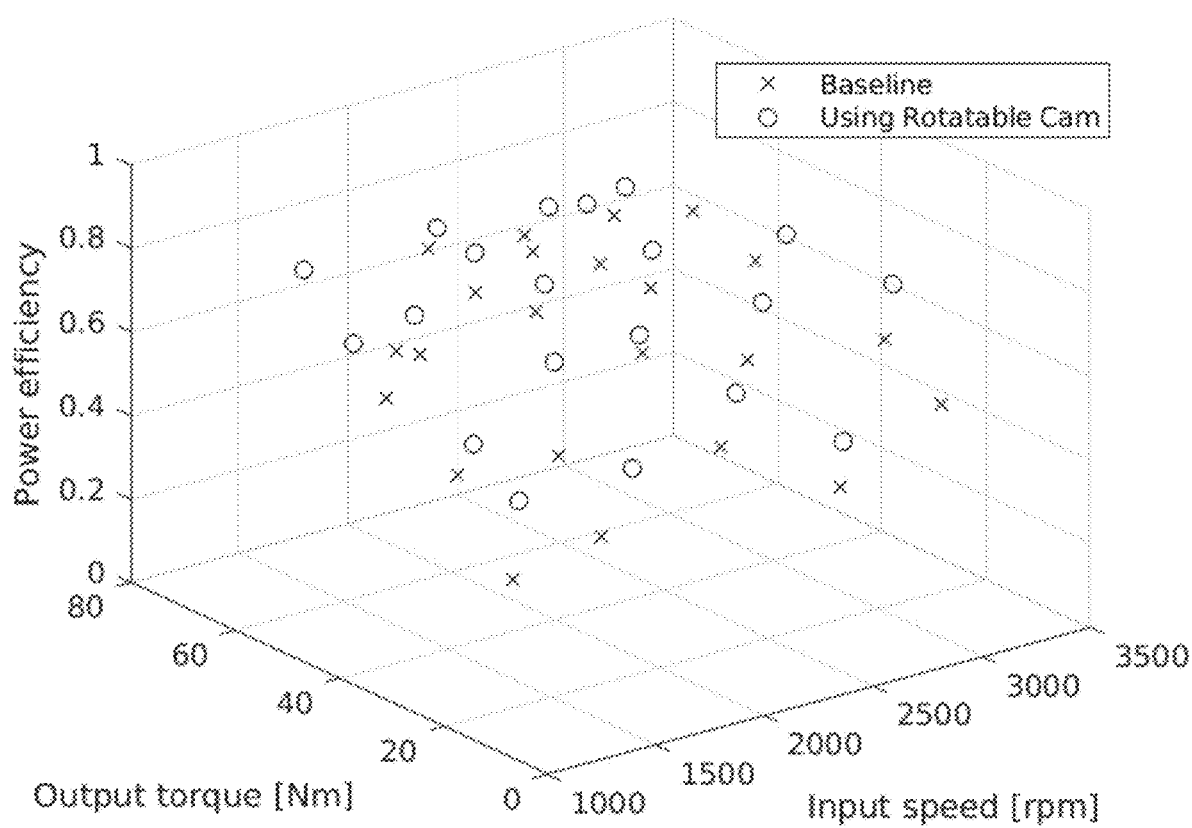
FIGS. 17 and 18 present plots of power efficiency data obtained for a stock iHMT and a modified iHMT described in the Examples section.
Figure 18:
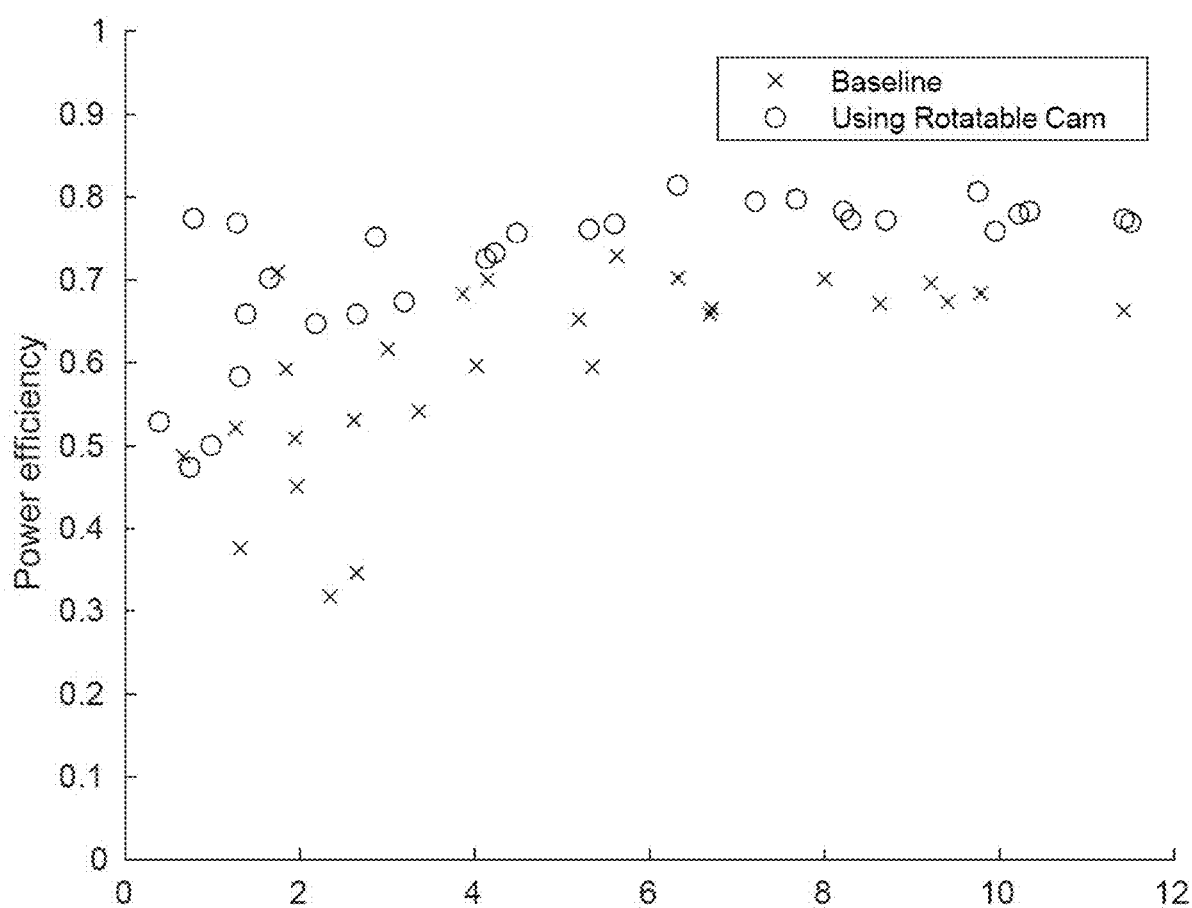

A prototype cam in accordance with principles of the present disclosure and akin to the profile of FIG. 8 was prepared for use with an existing iHMT akin to the iHMT 50 of FIG. 2C. Prior to installing the prototype cam to the existing iHMT, the existing iHMT was operated to obtain power efficiency data at one transmission ratio as functions of input speed and output torque, and as a function of output power. The prototype cam was installed to the existing iHMT so as to be rotatable relative to the motor distributor valves as described above. The so-modified iHMT was then operated to obtain power efficiency data at one transmission ratio as functions of input speed and output torque, and as a function of output power. FIG. 17 provides a comparison of the power efficiency data obtained for the existing iHMT prior to modification ("Baseline") and for the modified iHMT ("Using Rotatable Cam") at one transmission ratio as functions of input speed and output torque. FIG. 18 provides a comparison of the power efficiency data obtained for the existing iHMT prior to modification ("Baseline") and for the modified iHMT ("Using Rotatable Cam") at one transmission ratio as a function of input power.

Figure 11:
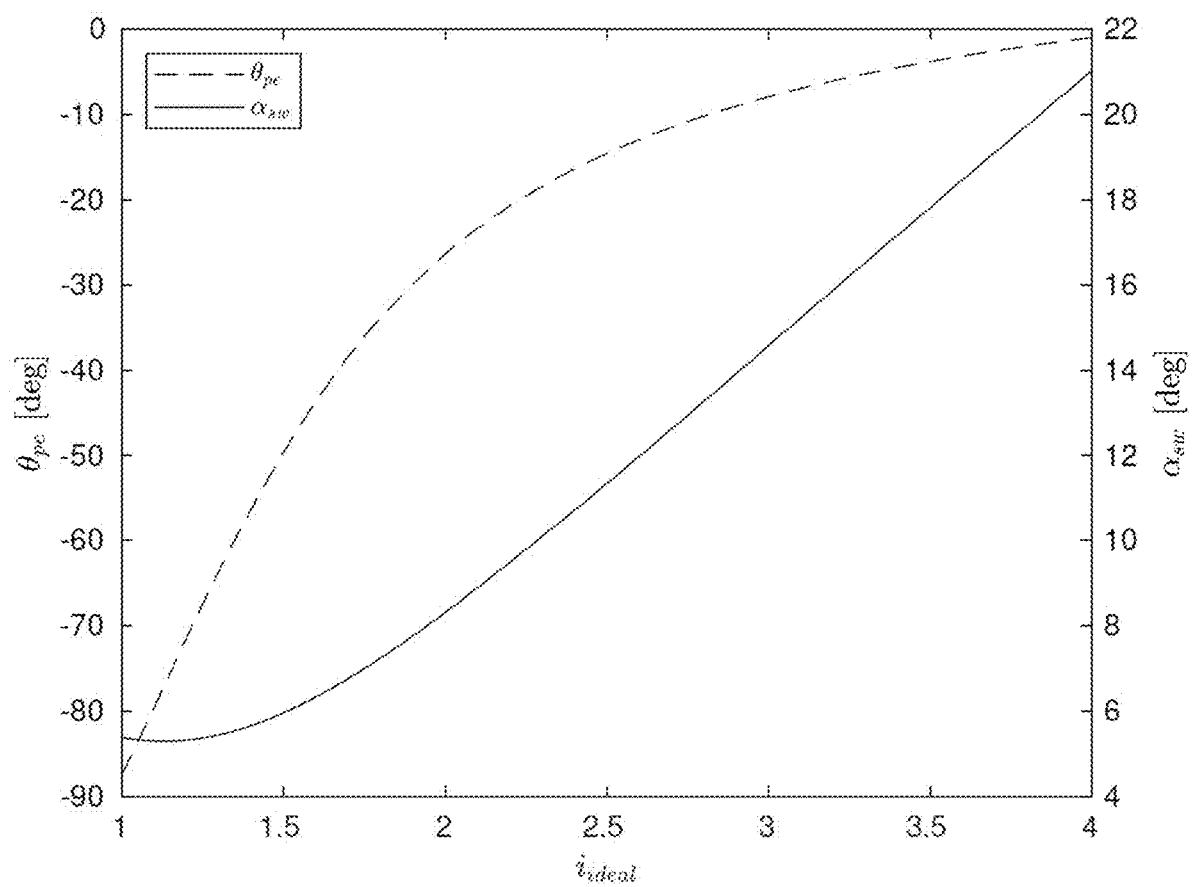
FIG. 11 is a graph illustration relationships between $i_{ideal}$, $\alpha_{sw}$, and $\theta_{pe}$ as described in the Examples section.

As shown in FIG. 11, a slightly larger swashplate angle $\alpha_{sw}$ is required at higher operating pressures than at lower pressures for the same transmission ratio. Likewise, a smaller angle of cam rotation $|\theta_{pe}|$ is required at lower pressures than at higher pressures. This means that the transmission control system may require measurements of the operating pressure $P_g$ to achieve optimal efficiency. If the transmission is driven by an electronically-controlled engine, then $P_g$ may be calculated from an estimate of the engine's output torque from the ECU. Alternatively, a torque sensor could be introduced on either the input shaft or the output shaft.

With non-limiting examples in which principles of the present disclosure are utilized in modifying an iHMT, additional features can optionally be employed to promote the modified iHMT achieving its maximum transmission ratio with optimal pre-compression when the operating pressure deviates from the design pressure of the cam. Two options to address this issue are:

1. Allow non-optimal pre-compression to achieve the maximum transmission ratio; and
2. Maintain optimal pre-compression and accept a lower maximum transmission ratio.

The solution to this trade-off will depend on the relative importance of efficiency and maximum transmission ratio in a given application. For instance, if a high $i_{ideal}$ will be required only at high input torque levels, the cam profile may be designed for a large $P_g$. In that case, the resulting smaller range of transmission ratios at lower operating pressures will be acceptable.

The systems, devices and methods of the present disclosure provide a marked improvement over previous designs. For example, a rotatable valve cam and control strategy have been designed for axial-piston hydraulic motors with distributor valves (e.g., radial spool valves). The designs and methods of the present disclosure can be useful with a variety of hydraulic axial-piston devices; for example, the designs and methods of the present disclosure can be applied to the motor in an iHMT. In some non-limiting examples, an iHMT modified in accordance with principles of the present disclosure will have an estimated power efficiency improvement of 4.8% to 14.4% at various operating conditions.

Although the present disclosure has been described with reference to preferred embodiments, workers skilled in the art will recognize that changes can be made in form and detail without departing from the spirit and scope of the present disclosure.

What is claimed is:

1. An axial piston hydraulic device comprising:
a barrel forming a plurality of cylinder bores, wherein the barrel is rotatable about a centerline;
a plurality of pistons, wherein respective ones of the pistons are slidably maintained within corresponding ones of the cylinder bores;
a swashplate positioned to interface with the pistons with rotation of the barrel;
a plurality of distributor valves, wherein respective ones of the distributor valves are in fluid communication with corresponding ones of the pistons; and
a valve cam defining a profile, wherein valve cam is positioned such that the profile interfaces with the distributor valves with rotation of the barrel;
wherein an arrangement of the valve cam profile relative to the distributor valves is rotatably adjustable about the centerline of the barrel.

2. The hydraulic device of claim 1, wherein the valve cam is arranged to control operation of the distributor valves.

3. The hydraulic device of claim 2, wherein the profile is configured to dictate an operational state of each of the distributor valves as each of the distributor valves articulates along the profile.

4. The hydraulic device of claim 3, wherein the valve cam is an internal ring cam.

5. The hydraulic device of claim 2, wherein an interface between each of the distributor valves and the valve cam controls fluid connection between the corresponding piston and a high pressure passage, and between the corresponding piston and a low pressure passage.

6. The hydraulic device of claim 5, wherein the hydraulic device is configured such that adjusting a rotational angle of the valve cam relative to the distributor valves changes a timing of the fluid connection between each of the pistons and the high and low pressure passages with rotation of the barrel.

7. The hydraulic device of claim 1, wherein an angle of the swashplate relative to the pistons is adjustable.

8. The hydraulic device of claim 7, wherein a selected rotational angle of the valve cam relative to the distributor valves is based upon a selected tilt angle of the swashplate relative to the pistons.

9. The hydraulic device of claim 7, wherein a rotational angle of the valve cam relative to the distributor valves and ana tilt angle of the swashplate relative to the pistons are selected to adjust displacement the pistons while maintaining optimal pre-compression and decompression.

10. The hydraulic device of claim 9, wherein the rotational angle and the tilt angle are selected according to a mathematical relationship.

11. The hydraulic device of claim 10, wherein the mathematical relationship is based upon an area of each of the pistons.

12. An inline hydro-mechanical transmission comprising:
a fixed displacement pump;
pump distributor valves arranged to regulate fluid flow to and from the pump;
an axial piston hydraulic motor comprising:
a barrel forming a plurality of cylinder bores, wherein the barrel is rotatable about a centerline;
a plurality of pistons, wherein respective ones of the pistons are slidably maintained within corresponding ones of the cylinder bores;
a swashplate positioned to interface with the pistons with rotation of the barrel;
a plurality of motor distributor valves, wherein respective ones of the distributor valves are in fluid communication with corresponding ones of the pistons; and
a valve cam defining a profile, wherein the valve cam is positioned such that the profile interfaces with the motor distributor valves with rotation of the barrel;
wherein an arrangement of the valve cam profile relative to the motor distributor valves is rotatably adjustable about the centerline of the barrel;
wherein high pressure fluid from the pump is delivered to the motor via the pump distributor valves.

13. The transmission of claim 12, wherein an angle of the swashplate relative to the pistons is adjustable.

14. The transmission of claim 13, wherein a selected rotational angle of the valve cam relative to the distributor valves is based upon a selected tilt angle of the swashplate relative to the pistons.

15. The transmission of claim 13, wherein a rotational angle of the valve cam relative to the distributor valves and a tilt angle of the swashplate relative to the pistons are selected to adjust displacement the pistons while maintaining optimal pre-compression and decompression.

16. The transmission of claim 15, wherein the rotational angle and the tilt angle are selected according to a mathematical relationship.

17. The hydraulic device of claim 6, wherein:
the plurality of pistons includes a first piston slidably maintained with a first cylinder bore, the first piston reciprocating between a top dead center position and a bottom dead center position with rotation of the barrel;
the plurality of distributor valves includes a first distributor valve associated with the first cylinder bore, the first distributor valve configured to provide:
a high pressure passage open state in which the high pressure passage is open to the first cylinder, and
a high pressure passage closed state in which the high pressure passage is closed to the first cylinder;
when the valve cam is arranged at a first rotational angle, an interface with the profile with rotational of the barrel causes the first distributor valve to transition from the high pressure passage closed state to the high pressure passage open state at a first rotational angle of the barrel;
when the valve came is arranged at a second rotational angle, an interface with the profile with rotation of the barrel causes the first distributor valve to transition from the high pressure passage closed state to the high pressure passage open state at a second rotational angle of the barrel; and
the first rotational angle of the barrel differs from the second rotation angle of the barrel.

\* \* \* \* \*